United States Patent
Chou

(10) Patent No.: US 7,681,858 B1
(45) Date of Patent: Mar. 23, 2010

(54) PRELOADING AND FLEX RESISTANT SUPPORT BOARD FOR A MECHANICAL MACHINE

(75) Inventor: Chi-Pin Chou, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 12/346,055

(22) Filed: Dec. 30, 2008

(51) Int. Cl.
*F16M 1/00* (2006.01)
(52) U.S. Cl. ........................................ 248/637; 248/678
(58) Field of Classification Search ............... 248/678, 248/674, 637; 52/630, 800.1, 801.1, 801.11, 52/790.1, 223.6, 223.14, 291
See application file for complete search history.

(56) References Cited

U.S. PATENT DOCUMENTS

| | | | |
|---|---|---|---|
| 6,231,927 B1 * | 5/2001 | Ruid | 427/358 |
| 6,345,652 B1 * | 2/2002 | Townsend | 144/371 |
| 6,513,292 B2 * | 2/2003 | Kumon | 52/309.9 |
| 2001/0000875 A1 * | 5/2001 | Townsend | 144/371 |
| 2008/0110126 A1 * | 5/2008 | Howchin | 52/630 |
| 2008/0127594 A1 * | 6/2008 | Kennedy | 52/630 |
| 2009/0000248 A1 * | 1/2009 | Waters et al. | 52/800.1 |

FOREIGN PATENT DOCUMENTS

| | | | | |
|---|---|---|---|---|
| DE | 0033032333 | * | 8/1984 | 248/246 |
| JP | 2000345708 | * | 12/2000 | |

* cited by examiner

*Primary Examiner*—Ramon O Ramirez
(74) *Attorney, Agent, or Firm*—Banger Shia

(57) ABSTRACT

A preloading and flex resistant support board for a mechanical machine comprises a support board body and at least one preloading bar. The support board body is formed with at one preloading groove in the side subjected to the compressive stress. The preloading groove is provided with two resisting surfaces. The preloading bar is also provided with two resisting surfaces. The preloading bar is assembled in the preloading groove of the support board body by screw, so as to provide a balance between the preloading capacity produced by preloading bar to the support board body and the flexing stress produced by the support board body.

5 Claims, 7 Drawing Sheets

PRELOADING AND FLEX RESISTANT SUPPORT BOARD FOR A MECHANICAL MACHINE

BACKGROUND OF THE INVENTION

1. Field of the Invention

The present invention relates to a support board for a linear motion processing machine, and more particularly to a preloading and flex resistant support board for a mechanical machine.

2. Description of the Prior Art

Common machines used in mechanical industry mostly use a support board 90 (as shown in FIG. 1) with a large length-width ratio as a carrying means on demand, and the support board 90 can only provide support at both ends thereof.

However, as shown in FIG. 2, the support board 90 is likely to sag in the middle due to the effect of its gravity. The present method to prevent the middle deformation is to decrease the amount of material of the support board 90. Weight reduction may prevent deformation, however, it also reduces the loading capacity, so, when subjected to a load, the deformation of the support board 90 will get worse.

The present invention has arisen to mitigate and/or obviate the afore-described disadvantages.

SUMMARY OF THE INVENTION

The primary objective of the present invention is to provide a preloading and flex resistant support board for mechanical machines, whose flex resistance is improved by the use of a preloading groove with a preloading bar.

To achieve the above objective, the preloading and flex resistant support board in accordance with the present invention comprises: a support board body and at least one preloading bar, wherein the support board body is provided in one side thereof with at least one preloading groove, the preloading groove is provided with a resisting surface on each of two opposite ends thereof, the preloading bar is disposed in the preloading groove of the support board body, and the preloading bar is provided with a resisting surface on each of two opposite ends thereof to resist against the resisting surfaces of the preloading groove.

With the above arrangements, the present invention has the following advantages: The support board body is provided with the preloading bar in the preloading groove thereof, therefore, it can produce a moment of inertia which is strong enough to support the support board body from deformation, thus improving the loading capacity of the support board of the present invention.

DETAILED DESCRIPTION OF THE PREFERRED EMBODIMENTS

Figure 1:
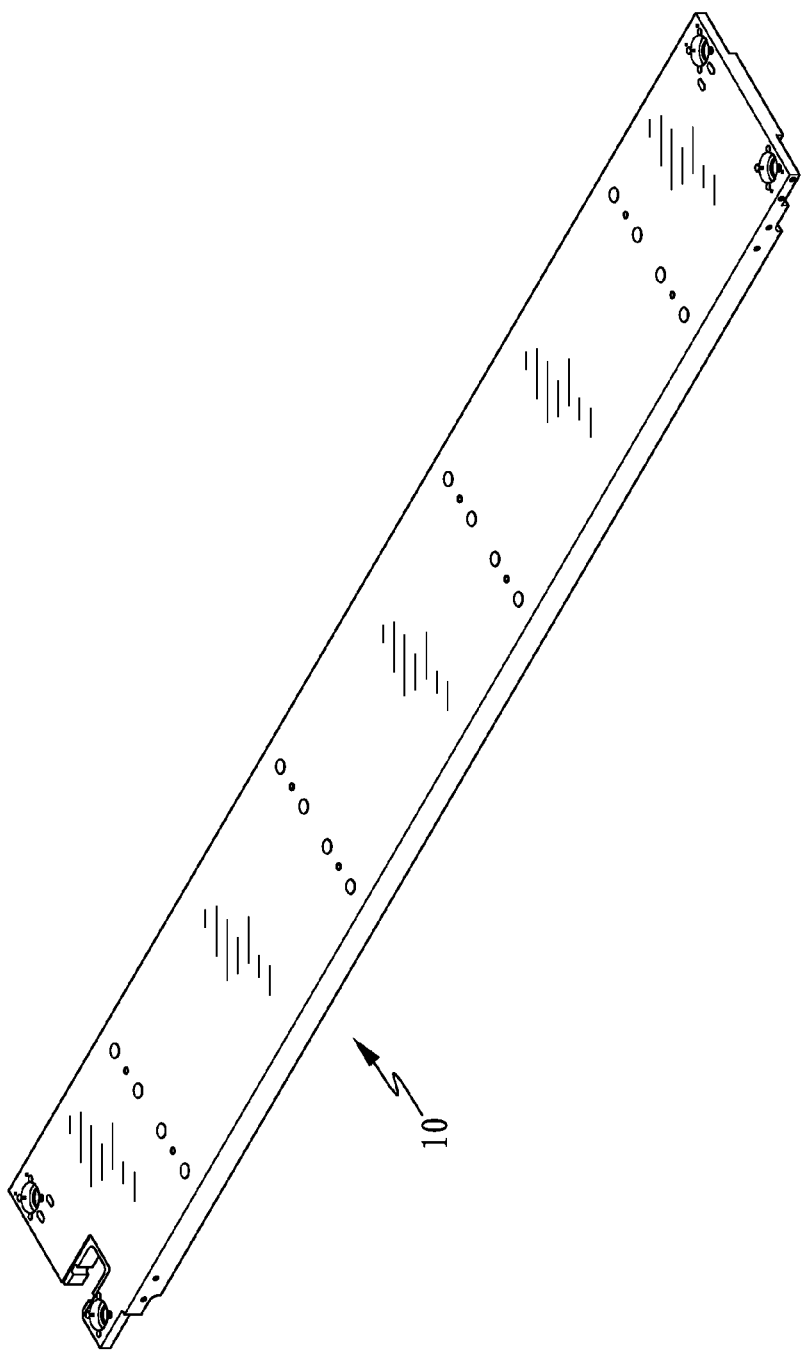
FIG. 1 is a perspective view of a conventional support board.
Figure 2:
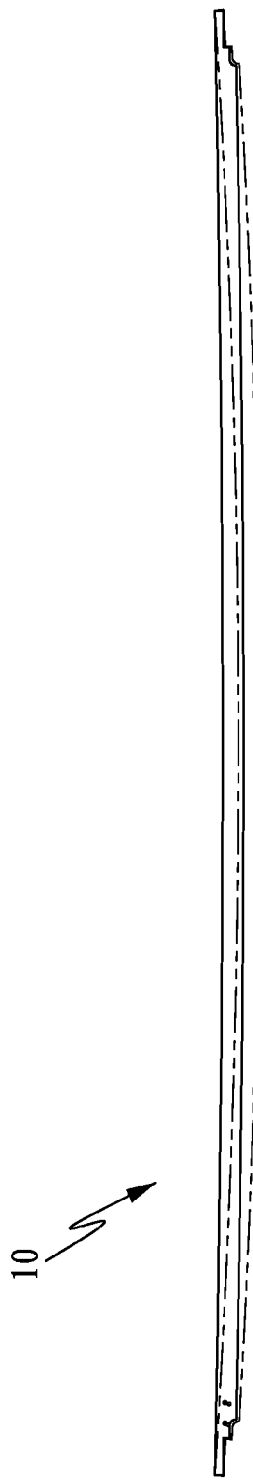
FIG. 2 is a side view of the conventional support board.
Figure 3:
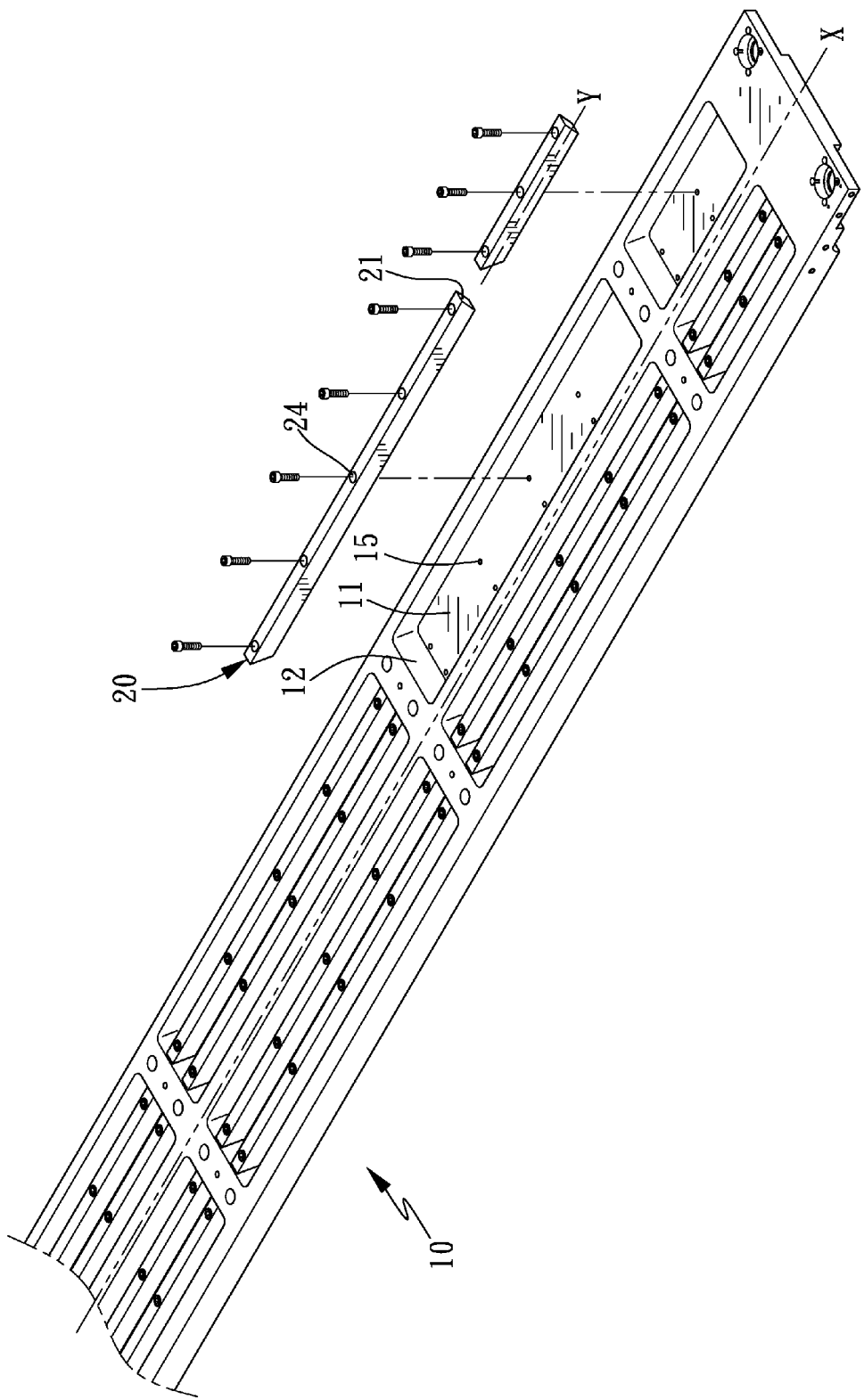
FIG. 3 is a perspective view of a support board in accordance with the present invention.
Figure 4:
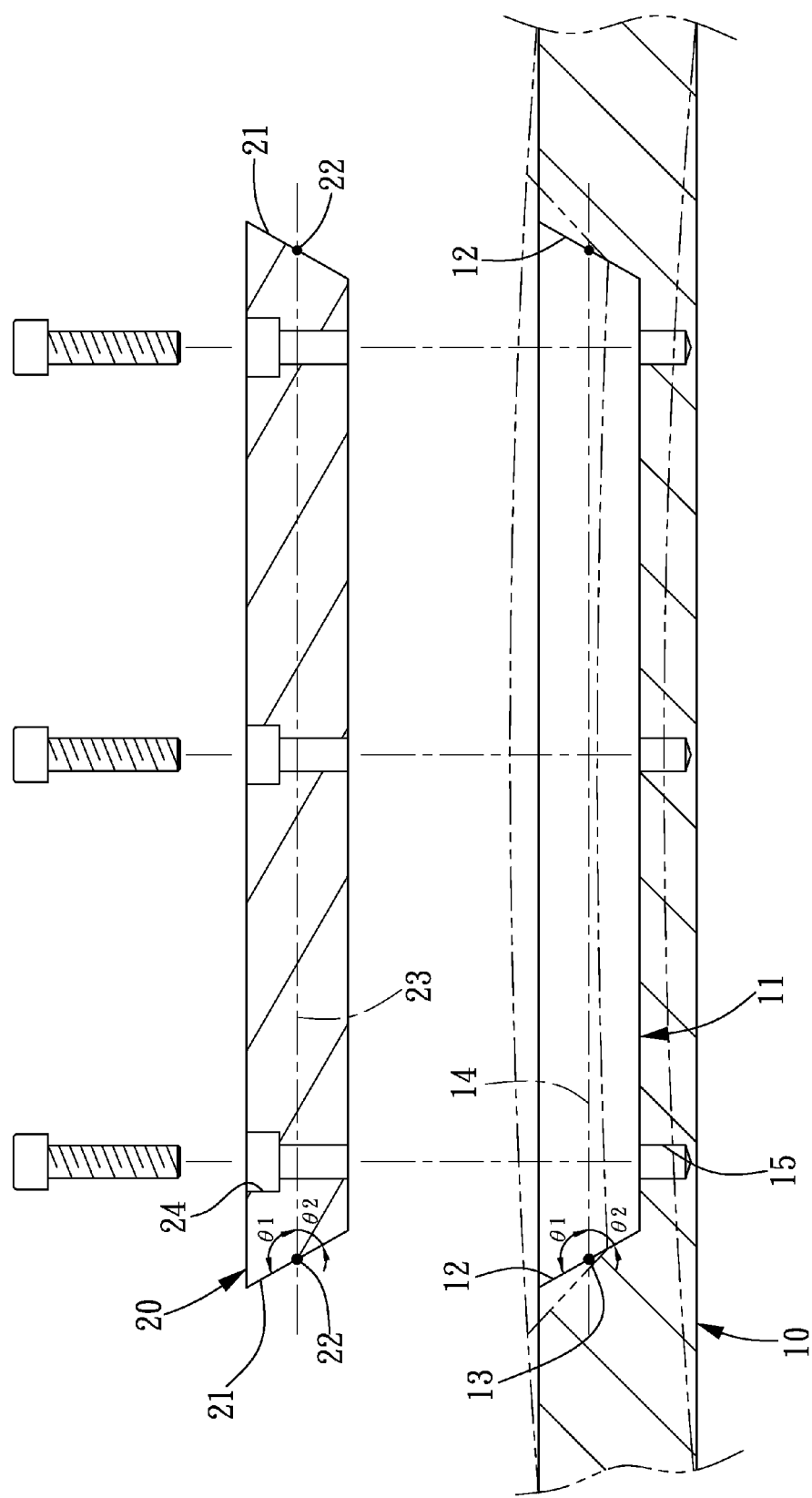
FIG. 4 is a side view of the unassembled support board in accordance with the present invention.

The present invention will be clearer from the following description when viewed together with the accompanying drawings, which show, for purpose of illustrations only, the preferred embodiment in accordance with the present invention.

Referring to FIGS. 3-7, a support board in accordance with the present invention comprises a support board body 10 and at least one preloading bar 20. The axial direction of the support board body 10 is designated by X. The support board body 10 is radially formed with at least one preloading groove 11 in a top thereof. If the number of the preloading grooves 11 exceeds one, the preloading grooves 11 will be arranged in matrix. The preloading groove 11 is provided with a resisting surface 12 on each of two opposite ends thereof. The two resisting surfaces 12 of the preloading groove 11 are symmetrically arranged and incline outwards in opposite directions. Each of the two resisting surfaces 12 has a virtual mid-point 13, and the two mid-points 13 define a virtual line 14 which intersects with each of the two resisting surfaces 12 to define a first angle θ1 and a second angle θ2, wherein the first angle θ1 is an obtuse angle, the second angle θ2 is an acute angle, and the sum of the first and second angles θ1, θ2 is 180 degrees. The preloading groove 11 is formed with at least one support groove 15 in a bottom thereof.

Figure 5:
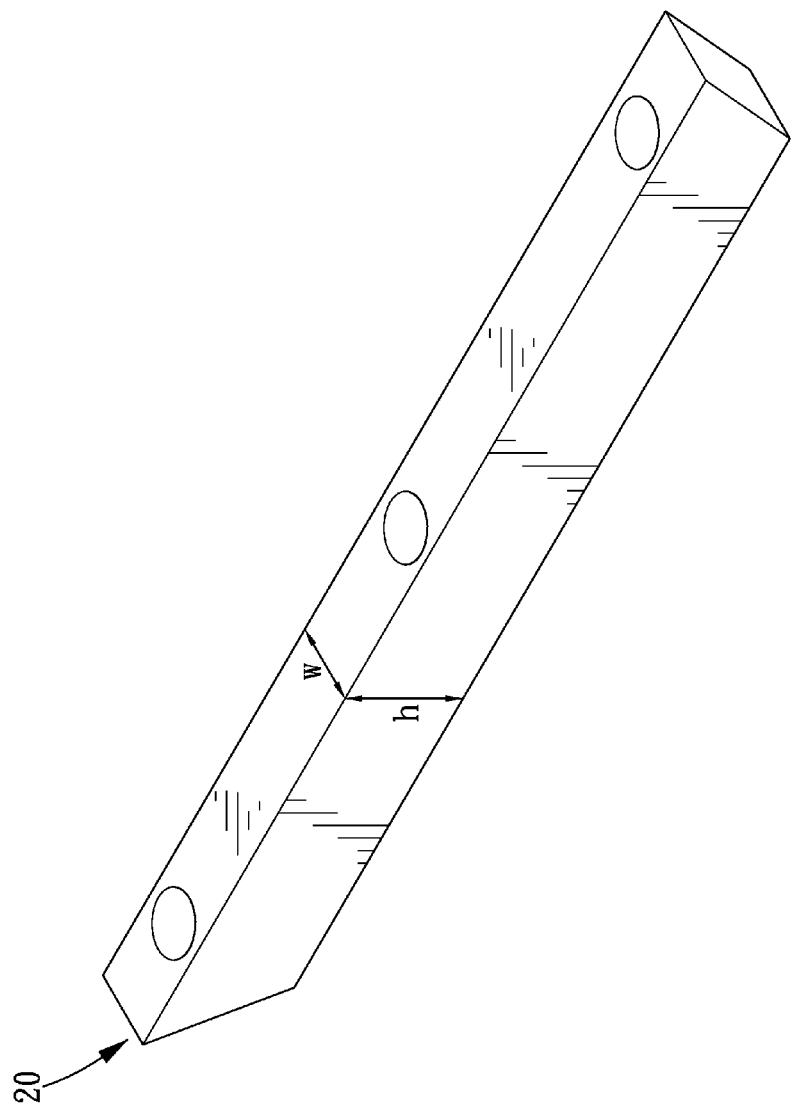
FIG. 5 is a perspective view of the preloading bar in accordance with the present invention.

The axial direction of the preloading bar 20 is designated by Y. The preloading bar 20 is provided with a resisting surface 21 on each of two opposite ends thereof. Each of the two resisting surfaces 21 has a virtual mid-point 22, and the two mid-points 22 define a virtual line 23 which intersects with each of the two resisting surfaces 21 to define a first angle θ3 and a second angle θ4, wherein the first angle θ3 is an obtuse angle, the second angle θ4 is an acute angle, and the sum of the first angle θ3 and the second angle θ4 is 180 degrees. Referring to FIG. 5, the width of preloading bar 20 is w, and the height of the preloading bar 20 is h. According to the equation of moment of inertia: $I = w*h^3/12$, when the height h is much greater than the width w, the moment of inertia I will be very large, and similarly, when the height h is much smaller than the width w, the moment of inertia I will be very small. As known from the above-mentioned, when the preloading bar 20 is such that its height h is larger than its width w, the preloading bar 20 is greater in rigidity than the support board body 10. The preloading bar 20 is radially formed with at least one limiting hole 24 from the top to the bottom thereof.

Figure 6:
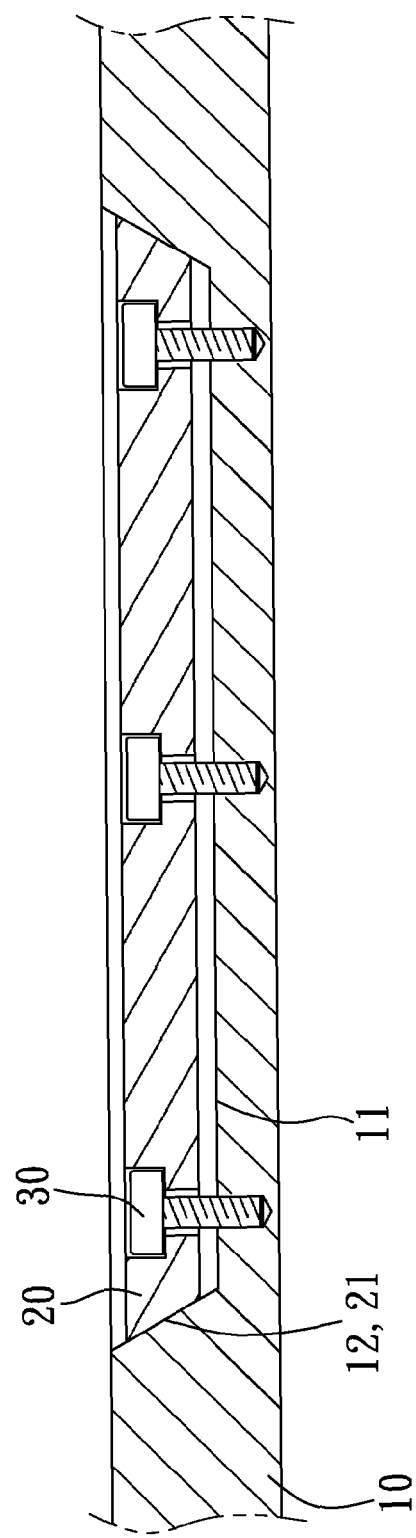
FIG. 6 is an assembly view of the support board in accordance with the present invention.

Referring to FIG. 6, the preloading bar 20 is disposed in the preloading groove 11 in such a manner that the resisting surfaces 21 of the preloading bar 20 resist against the resisting surfaces 12 of the preloading groove 11. If the limiting hole 24 of the preloading bar 20 is aligned with the support groove 15 of the preloading groove 15, plural screws 30 will be screwed in the limiting hole 24 of the preloading bar 20 and the support groove 15 of the preloading groove 11. Once the screws 30 are screwed, the preloading bar 20 will be pushed by the screws 30 to resist against the preloading groove 11 tightly.

In order to improve the preloading capacity of the preloading bar 20 to the support board body 10, the support board body 10 will be pre-distorted by an external force, so that when both ends of the support board body 10 are fixed, the top of the middle portion of the support board body 10 will produce a tensile stress, and the bottom of the middle portion of the support board body 10 will produce a compressive force, thus upheaving the middle portion of the support board body 10. At this moment, the preloading groove 11 will be propped open, so that the preloading bar 20 can be positioned on the support board body 10 by the screws 30.

Figure 7:
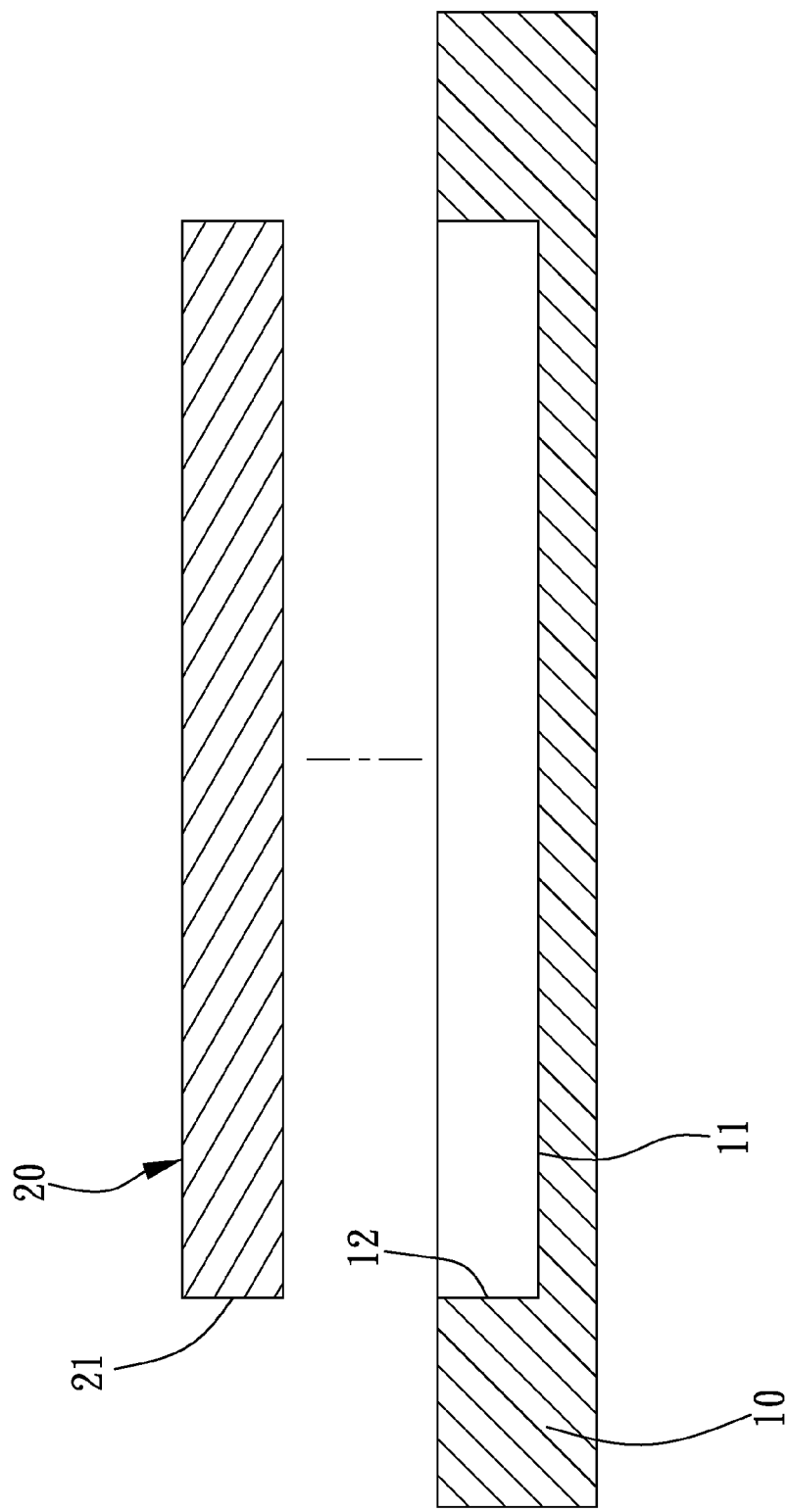
FIG. 7 is a cross-sectional view of another support board in accordance with the present invention.

The above resisting surfaces 12 of the preloading groove 11 and the above resisting surfaces 21 of the preloading bar 20 are all designed to incline, so that it is necessary to use the screws 30 to position the preloading bar 20 in the preloading groove 11. However, as shown in FIG. 7, the two resisting surfaces 12 of the preloading groove 11 are both designed to be vertical to their adjacent surfaces, so that the two resisting surfaces 12 will be parallel to each other. Similarly, the resisting surfaces 21 of the preloading bar 20 are both designed to be vertical to their adjacent surfaces, so that the two resisting surfaces 21 will be parallel to each other. By such arrangements, the preloading bar 20 can be tightly assembled to the preloading groove 11 without using the screws 30. Therefore, the resisting surfaces 12 of the preloading groove 11 and the resisting surfaces 21 of the preloading bar 20 can be changed in angle as desired.

While we have shown and described various embodiments in accordance with the present invention, it is clear to those skilled in the art that further embodiments may be made without departing from the scope of the present invention.

What is claimed is:

1. A preloading and flex resistant support board for a mechanical machine comprising:
   a support board body being radially formed with at least one preloading groove in one side thereof, the preloading groove being provided with a resisting surface on each of two opposite ends thereof; and
   at least one preloading bar disposed in the preloading groove of the support board body, the preloading bar being provided with a resisting surface on each of two opposite ends thereof to resist against the resisting surfaces of the preloading groove;
   wherein the preloading groove is formed with at least one support groove, the preloading bar is formed with at least one limiting hole, a screw is screwed in the limiting hole of the preloading bar and the support groove of the preloading groove to make the resisting surfaces of the preloading groove resist against the resisting surfaces of the preloading bar tightly;
   each of the two resisting surfaces of the preloading groove has a virtual mid-point, and the two virtual mid-points of the two resisting surfaces of the preloading groove define a virtual line, which intersects with each of the two resisting surfaces of the preloading groove to define a first angle and a second angle, each of the two resisting surfaces of the preloading bar has a virtual mid-point, and the two virtual mid-points of the two resisting surfaces of the preloading bar define a virtual line, which intersects with each of the two resisting surfaces of the preloading bar to define a first angle and a second angle.

2. The preloading and flex resistant support board for a mechanical machine as claimed in claim 1, wherein the first angle of the preloading groove is an obtuse angle, and the second angle of the preloading groove is an acute angle, and a sum of the first and the second angles of the preloading groove is 180 degrees, the first angle of the preloading bar is an obtuse angle, the second angle of the preloading bar is an acute angle, and a sum of the first and the second angles of the preloading bar is 180 degrees.

3. The preloading and flex resistant support board for a mechanical machine as claimed in claim 1, wherein the first angle of the preloading groove is an acute angle, and the second angle of the preloading groove is an obtuse angle, and a sum of the first and the second angles of the preloading groove is 180 degrees, the first angle of the preloading bar is an acute angle, the second angle of the preloading bar is an obtuse angle, and a sum of the first and the second angles of the preloading bar is 180 degrees.

4. The preloading and flex resistant support board for a mechanical machine as claimed in claim 1, wherein each of the two resisting surfaces of the preloading groove has a virtual mid-point, and the two virtual mid-points of the two resisting surfaces of the preloading groove define a virtual line, which intersects with each of the two resisting surfaces of the preloading groove to define a first angle and a second angle, each of the two resisting surfaces of the preloading bar has a virtual mid-point, and the two virtual mid-points of the two resisting surfaces of the preloading bar define a virtual line, which intersects with each of the two resisting surfaces of the preloading bar to define a first angle and a second angle.

5. The preloading and flex resistant support board for a mechanical machine as claimed in claim 4, wherein the first angle of the preloading groove is a right angle, the second angle of the preloading groove is also a right angle, and a sum of the first and the second angles of the preloading groove is 180 degrees, the first angle of the preloading bar is a right angle, the second angle of the preloading bar is also a right angle, and a sum of the first and the second angles of the preloading bar is 180 degrees.

* * * * *